United States Patent
Van Winkle et al.

(10) Patent No.: US 11,954,723 B2
(45) Date of Patent: *Apr. 9, 2024

(54) REPLACED DEVICE HANDLER

(71) Applicant: eBay Inc., San Jose, CA (US)

(72) Inventors: Justin Van Winkle, San Jose, CA (US); David Ramadge, San Jose, CA (US); Corinne Elizabeth Sherman, San Jose, CA (US)

(73) Assignee: eBay Inc., San Jose, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 17/125,098

(22) Filed: Dec. 17, 2020

(65) Prior Publication Data

US 2021/0103976 A1    Apr. 8, 2021

Related U.S. Application Data

(63) Continuation of application No. 14/714,740, filed on May 18, 2015, now Pat. No. 10,902,507.

(51) Int. Cl.
*G06Q 30/0601* (2023.01)
(52) U.S. Cl.
CPC .............................. *G06Q 30/0641* (2013.01)
(58) Field of Classification Search
None
See application file for complete search history.

(56) References Cited

U.S. PATENT DOCUMENTS

| | | | |
|---|---|---|---|
| 9,503,451 B1* | 11/2016 | Kane-Parry | H04L 63/083 |
| 10,902,507 B2 | 1/2021 | Winkle et al. | |
| 2003/0120552 A1 | 6/2003 | Butikofer | |
| 2004/0078124 A1 | 4/2004 | Schauble | |
| 2007/0250403 A1 | 10/2007 | Altschuler | |
| 2008/0007221 A1 | 1/2008 | Lee | |
| 2009/0300525 A1 | 12/2009 | Jolliff et al. | |
| 2014/0068721 A1 | 3/2014 | Ong et al. | |
| 2015/0067772 A1 | 3/2015 | Paek | |
| 2015/0379460 A1* | 12/2015 | Zamer | G06Q 10/087 705/28 |
| 2016/0105814 A1* | 4/2016 | Hurst | H04W 12/084 370/252 |
| 2016/0343063 A1 | 11/2016 | Van et al. | |

OTHER PUBLICATIONS

First Action Interview—Pre-interview communication received for U.S. Appl. No. 14/714,740, dated Oct. 12, 2017, 9 pages.
Final Office Action received for U.S. Appl. No. 14/714,740, dated Sep. 4, 2018, 20 pages.
Final Office Action Received for U.S. Appl. No. 14/714,740, dated Dec. 11, 2019, 31 pages.

(Continued)

*Primary Examiner* — Michelle T Kringen
(74) *Attorney, Agent, or Firm* — FIG. 1 Patents

(57) ABSTRACT

In various example embodiments, a system and method for handling a replaced smart device are presented. A computer-implemented replaced device handler detects that a user's smart device was replaced with a new device of the same class and, in response, presents the user with an invitation to sell their old device that has been replaced. A replaced device handler may be provided in connection with an on-line trading platform.

20 Claims, 5 Drawing Sheets

(56) References Cited

OTHER PUBLICATIONS

First Action Interview Office Action Summary received for U.S. Appl. No. 14/714,740, dated Feb. 9, 2018, 9 pages.
Non Final Office Action Received for U.S. Appl. No. 14/714,740, dated Apr. 2, 2020, 36 Pages.
Non-Final Office Action received for U.S. Appl. No. 14/714,740, dated May 2, 2019, 21 pages.
Notice Of Allowability received for U.S. Appl. No. 14/714,740, dated Nov. 3, 2020, 10 pages.
Notice Of Allowance received for U.S. Appl. No. 14/714,740, dated Oct. 19, 2020, 12 pages.
Lin et al., "A new remote user authentication scheme for multi-server architecture", Future Generation Computer Systems 19.1 (2003): 13-22. (Year: 2003), 2003, 10 pages.

* cited by examiner

REPLACED DEVICE HANDLER

RELATED APPLICATIONS

This application is a continuation of and claims priority to U.S. patent application Ser. No. 14/714,740 filed May 18, 2015, the entire contents of which are incorporated herein by reference.

TECHNICAL FIELD

Embodiments of the present disclosure relate generally to data processing and, more particularly, but not by way of limitation, to handling a replaced smart device.

BACKGROUND

An on-line trading platform allows users to shop for almost anything using, e.g., a web browser application or an application native to a mobile device. An electronic publication related to goods and/or services being offered for sale may be termed an item listing. A user may find an item listed by an on-line trading application by entering keywords into the search box provided on an associated web page or by browsing through the list of categories on the home page. After reading the item description and viewing the seller's reputation, the user may be able to either place a bid on the item or purchase it instantly.

Many users of an on-line trading platform periodically upgrade their smart electronic devices. For instance, some users upgrade their smart phones every two years, and their tablets every few years. A device that is replaced may no longer have much value to the person who replaced it with a new one, but these replaced devices may still have quite a bit of value if resold to others, for example, using an electronic listing created in the on-line trading platform.

BRIEF DESCRIPTION OF THE DRAWINGS

Various ones of the appended drawings merely illustrate example embodiments of the present disclosure and cannot be considered as limiting its scope.

Figure 1:
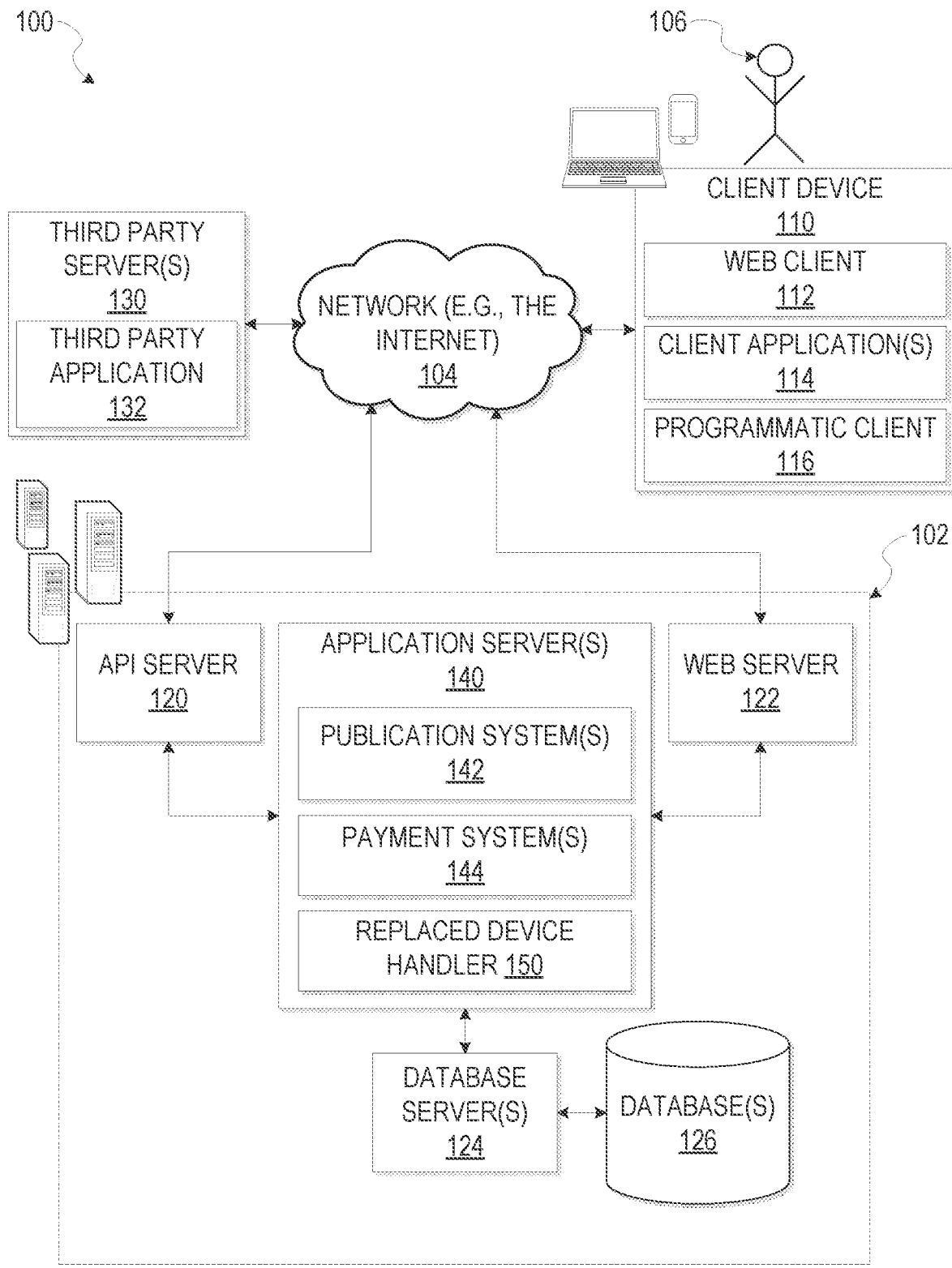
FIG. 1 is a diagrammatic representation of a network environment within which an example method and system to handle a replaced smart device may be implemented.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, many users of an on-line trading platform periodically upgrade their smart electronic devices. For instance, some users upgrade their smart phones every two years, and their tablets every few years. A device that is replaced may no longer have much value to the person who replaced it with a new one, but these replaced devices may still have quite a bit of value if resold to others. Some people may find it difficult or time consuming to create and populate an electronic listing that is required to offer an item for sale in an on-line trading platform.

In one example embodiment, a computer-implemented system is configured to detect that a user's smart device was replaced with a new one and, in response, present the user with an invitation to sell their old (replaced) device. Such system, which may be referred to as a replaced device handler, may be provided in connection with an on-line trading platform.

The invitation presented to a user by the replaced device handler may inform the user of a suggested price for the replaced device and, in some embodiments, with a sample item listing that has at least some of the fields automatically populated with information about the replaced device. Information about the replaced device may be automatically collected during times when the user is accessing or interacting with the on-line trading platform.

The information about the replaced device that is used to access the on-line trading platform may identify a type and model of the device, a resolution of a device screen, a type and version of an operating system executing on the device, a unique number assigned to the replaced device, and so forth. A replaced device handler may also be configured to monitor and collect information indicative of the duration and nature of the device utilization and its condition. For example, a replaced device handler accesses data collected at the device (e.g., data collected by temperature sensors that indicate whether a protective case was used, by accelerometers that detect drops or breakage, by battery cycle counters that provide information of how many times the replaced device was charged (and thus can be used as a proxy for overall usage)). Furthermore, the replaced device handler may be configured to access data stored by the on-line trading platform to determine an appropriate price for the replaced device, taking into account the characteristics of the device. This information may be stored by the on-line trading platform as the current device information associated with an identification of a user in the on-line trading platform. A replaced device handler uses the current device information to detect that a user's smart device was replaced with a new one.

In operation, according to one embodiment, when the replaced device handler detects certain user activity (e.g., user log in), the replaced device handler determines client device characteristics—data about the client device used for the log in (an instant device)—and compares this data to the current device information associated with the user in the on-line trading platform. The client device characteristics used to determine whether the instant device is the device associated with previously stored current device information may include screen resolution, model and make of the instant device, the operating system executing on the current device, etc.

If the results of the comparison indicate that the user is accessing the on-line trading platform from a device that is different from the device identified by the current device information, and the different device is of the same type as the device identified by the current device information, the replaced device handler launches a process for handling a replaced device. In some embodiments, the process for handling the replaced device is not launched if the replaced device handler determines that the user's device characteristics do not match the current device information and the user's device is of a type that is different from the type of a device indicated in the current device information. Different types (or classes) of devices will be understood as smart phones being one type of device, tablets being another type, laptops being yet another type, etc. For example, if the current device information is with respect to a smart phone, and if a user logs in from a tablet or from a desktop, the replaced device handler does not launch the process for handling a replaced device. An example replaced device handler may be implemented in the context of a network environment illustrated in FIG. 1.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110, and may be referred to as an on-line trading platform 102. FIG. 1 illustrates, for example, a web client 112 (e.g., a browser, such as the Internet Explorer® browser developed by Microsoft® Corporation of Redmond, Washington State), an application 114, and a programmatic client 116 executing on the client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, or any other communication device that a user may utilize to access the on-line trading platform 102. In some embodiments, the client device 110 comprises a display module (not shown) to display information (e.g., in the form of user interfaces). In further embodiments, the client device 110 comprises one or more of a touch screens, accelerometers, gyroscopes, cameras, microphones, global positioning system (GPS) devices, and so forth. The client device 110 may be a device of a user that is used to perform a transaction involving digital items within the on-line trading platform 102. In one embodiment, the on-line trading platform 102 is a network-based marketplace that responds to requests for product listings, publishes electronic publications comprising item listings of products available on the network-based marketplace, and manages payments for these marketplace transactions. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the on-line trading platform 102, on an as needed basis, for data or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the on-line trading platform 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the on-line trading platform 102 via the network 104. In this instance, the on-line trading platform 102, in response to receiving the input from the user, communicates information to the client device 110 via the network 104 to be presented to the user. In this way, the user can interact with the on-line trading platform 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

Additionally, a third party application 132, executing on third party server(s) 130, is shown as having programmatic access to the on-line trading platform 102 via the programmatic interface provided by the API server 120. For example, the third party application 132, utilizing information retrieved from the on-line trading platform 102, supports one or more features or functions on a website hosted by the third party. The third party website, for example, provides one or more promotional, marketplace, or payment functions that are supported by the relevant applications of the on-line trading platform 102.

The publication systems 142 provide a number of publication functions and services to users 106 that access the on-line trading platform 102. The payment systems 144 likewise provide a number of functions to perform or facilitate payments and transactions. While the publication system 142 and payment system 144 are shown in FIG. 1 to both form part of the on-line trading platform 102, it will be appreciated that, in alternative embodiments, each system 142 and 144 may form part of a payment service that is separate and distinct from the on-line trading platform 102.

In some embodiments, the payment systems 144 may form part of the publication system 142.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, California) to enable sellers to author and manage listings on the on-line trading platform 102 in an off-line manner, and to perform batch-mode communications between the programmatic client 116 and the on-line trading platform 102.

The application servers 140 also hosts a replaced device handler 150 that is configured to detect that a user's smart device was replaced with a new one and, in response, present the user with an invitation to sell their replaced device. The invitation may inform the user of a suggested price for the replaced device or with a sample item listing that has at least some of the fields automatically populated with information about the replaced device. As explained above, information about the replaced device may be automatically collected during the times when the user is accessing or interacting with the on-line trading platform 102. The information about a device that is used to access the on-line trading platform 102 may identify the type and model of the device, the resolution of the device screen, the type and version of the operating system executing on the device, a unique number assigned to the device, and so forth. The replaced device handler 150 may also be configured to monitor and collect information indicative of the duration and nature of the device utilization and its condition. For example, the replaced device handler 150 may access data collected at the device (e.g., at the client device 110), such as, for example, data collected by the temperature sensors that may indicate whether a protective case was used, by accelerometers that can detect drops or breakage, by battery cycle counters that can provide information of how many times the device was charged (and thus can be used as a proxy for overall usage), etc. Furthermore, the replaced device handler 150 may be configured to access data stored by the on-line trading platform 102 to determine an appropriate price for the replaced device, taking into account the characteristics of the device. This information may be stored by the on-line trading platform 102 as the current device information associated with an identification of a user in the on-line trading platform 102 (e.g., in the database 126).

The replaced device handler 150 uses the current device information to detect that a user's smart device was replaced with a new one. In operation, according to one embodiment, when the replaced device handler 150 detects certain user activity (e.g., user log in), the replaced device handler 150 determines client device characteristics—data about the client device used for the log in—and compares this data to the current device information associated with the user in the on-line trading platform. If the results of the comparison indicate that the user is accessing the on-line trading platform 102 from a device that is different from the device identified by the current device information, and the different device is of the same type as the device identified by the current device information, the replaced device handler 150 launches a process for handling a replaced device.

In some embodiments, the process for handling a replaced device is not launched if the replaced device handler 150 determines that the user's device characteristics do not match the current device information and the user's device is of a type that is different from the type of a device indicated in the current device information. As explained above, different types (or classes) of devices will be understood as smart phones being one type of device, tablets being another type, laptops being yet another type, etc. For example, if the current device information is with respect to a smart phone, and if a user logs in from a tablet or from a desktop, the replaced device handler 150 does not launch the process for handling a replaced device.

In some example embodiments, the replaced device handler 150 may communicate with the publication systems 120 (e.g., accessing item listings) and payment system 122. In an alternative embodiment, the replaced device handler 150 may be a part of the publication system 120.

It will be noted that, while the client-server-based network architecture 100 shown in FIG. 1 employs a client-server architecture, the present inventive subject matter is of course not limited to such an architecture, and could equally well find application in a distributed, or peer-to-peer, architecture system, for example. The publication system 142, payment system 144, and replaced device handler 150 could also be implemented as standalone software programs. In some embodiments, the replaced device handler may be implemented as part of the publication system 142. An example replaced device handler is described below, with reference to FIG. 2.

Figure 2:
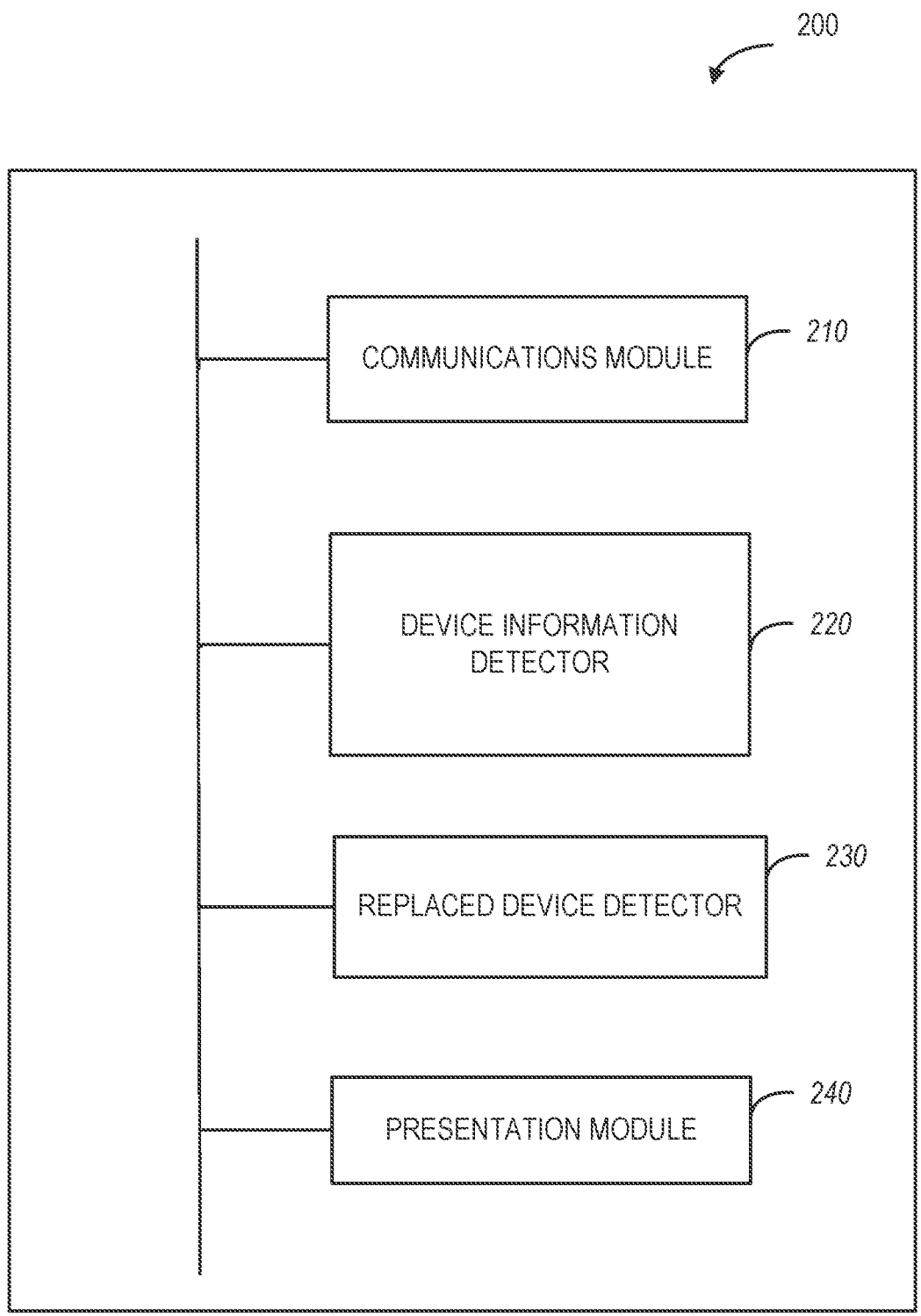
FIG. 2 is block diagram of a system to handle a replaced smart device, in accordance with one example embodiment.

FIG. 2 is a block diagram of a system 200 to handle a replaced smart device, also referred to as a replaced device handler, in accordance with one example embodiment. As shown in FIG. 2, the system 200 includes a communications module 210, a device information detector 220, a replaced device detector 230, and a presentation module 240. The communications module 210 is configured to receive a communication from a client device associated with a user identification in an on-line trading platform. The device information detector 220 is configured to determine instant device information representing the client device. The instant device information, also referred to as client device characteristics, may include screen resolution, model and make of the instant device, the operating system executing on the current device, etc. The device information detector 220 may also be configured to collect current device information, where the current device information is associated with a device controlled by a user represented by the user identification to access the on-line trading platform, and to store the collected information as part of the previously stored current device information (e.g., in the database 126 of FIG. 1).

The replaced device detector 230 is configured to determine whether the client device is a new device with respect to a replaced device, where the replaced device is a device associated, in the on-line trading platform, with the user identification. The determination that the client device is a new device is made based on comparison of the instant device information with the previously stored current device information. The current device information, in one embodiment, may include data obtained by one or more temperature sensors, accelerometers, battery cycle counters, as well as by other on-device components provided at the device controlled by the user represented by the user identification. The current device information may also comprise data indicative of a model and a brand of the device controlled by the user.

The presentation module 240 is configured to cause a presentation on a display device of an invitation to create an electronic listing in the on-line trading platform to sell the replaced device. The presentation module 240 may be configured to utilize the previously stored current device information to automatically populate one or more fields in an form used to create the electronic listing comprising a publication to sell the replaced device or a template for creating such listing and cause presentation of the form used to create the electronic listing on the display device. The presentation module 240 may also be configured to utilize the previously stored current device information and further information stored by the on-line trading platform to determine a suggested price for the replaced device and cause presentation of the suggested price on the display device. The further information may include data obtained from other listings in the on-line trading platform that lists devices that are similar to the replaced device. In one embodiment, the replaced device detector 230 is configured to determine that a class of the instant device is different from a class of the current device and cause the presentation module 240 to refrain from causing the presentation of the invitation. The replaced device may be a smart phone, a tablet, or another device suitable for accessing services provided by the on-line trading platform. Example operations performed by the replaced device handler 200 are described with reference to FIG. 3.

Figure 3:
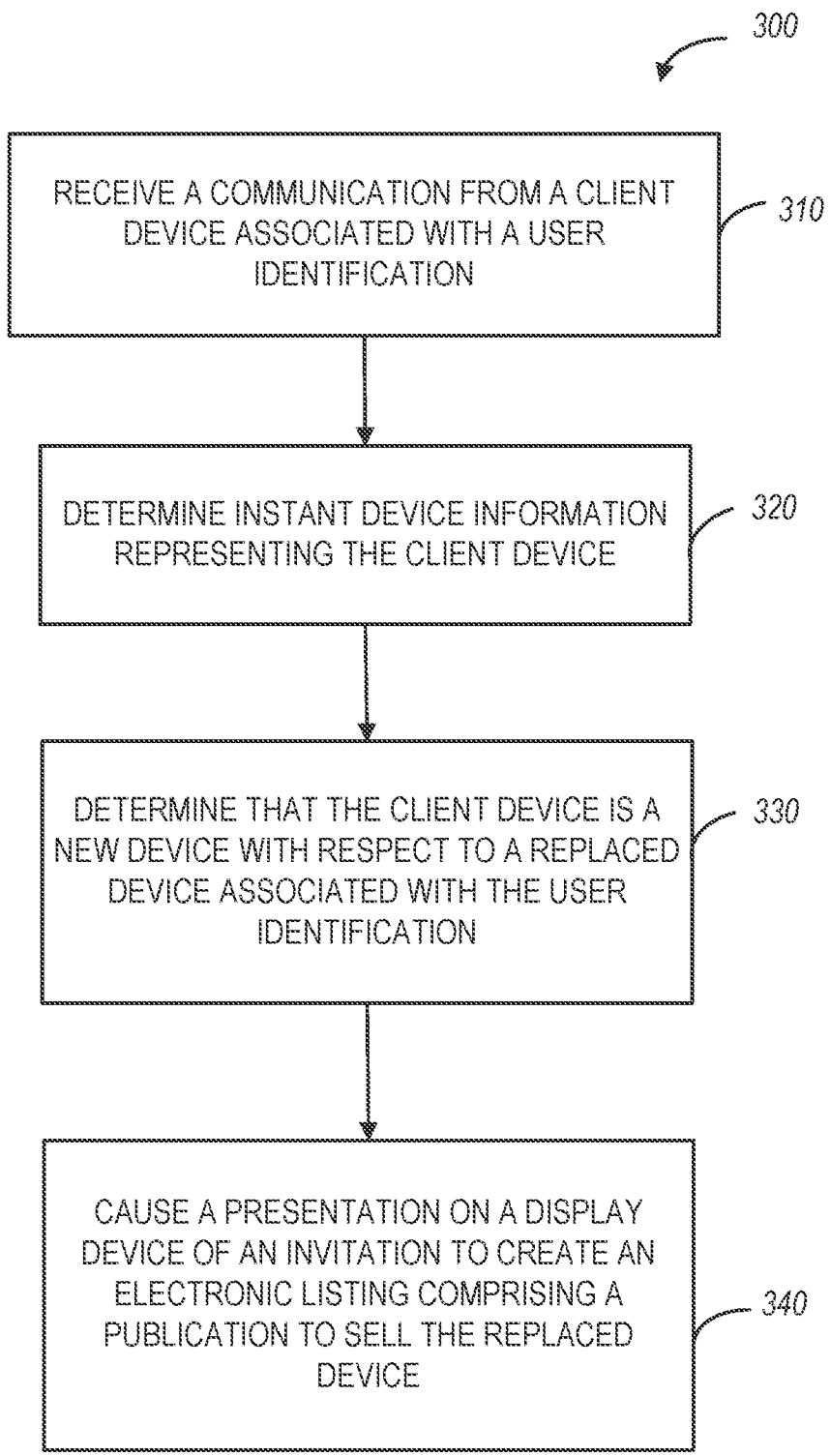
FIG. 3 is a flow chart of a method to handle a replaced smart device, in accordance with an example embodiment.

FIG. 3 is a flow chart of a method 300 to handle a replaced smart device, according to one example embodiment. The method 300 is performed by processing logic that may comprise hardware (e.g., dedicated logic, programmable logic, microcode, etc.), software (such as run on a general purpose computer system or a dedicated machine), or a combination of both. In one example embodiment, the processing logic resides at the application servers 140 of FIG. 1 and, in particular, the replaced device handler 150.

As shown in FIG. 3, the method 300 commences at operation 310, when the communications module 210 of FIG. 2 receives a communication from a client device associated with a user identification in an on-line trading platform. The device information detector 220 of FIG. 2 determines instant device information representing the client device, at operation 320. The instant device information, also referred to as client device characteristics, may include screen resolution, model and make of the instant device, the operating system executing on the current device, etc.

At operation 330, the replaced device detector 230 of FIG. 2 determines that the client device is a new device with respect to a replaced device, where the replaced device is a device associated, in the on-line trading platform, with the user identification. The determination that the client device is a new device is made based on comparison of the instant device information with the previously stored current device information. As explained above, the current device information may include data obtained by one or more temperature sensors, accelerometers, battery cycle counters, as well as by other on-device components provided at the device controlled by the user represented by the user identification. The current device information may also comprise data indicative of a model and a brand of the device controlled by the user.

At operation 340, the presentation module 240 of FIG. 2 causes presentation on a display device of an invitation to create an electronic listing in the on-line trading platform to sell the replaced device. As explained above, the invitation to create an electronic listing in the on-line trading platform may inform the user of a suggested price for the replaced device or with a sample item listing that has at least some of the fields automatically populated with information about the replaced device. For example, some of the fields automatically populated with information about the type and model of the device, the resolution of the device screen, the type and version of the operating system executing on the device, the condition of the device, as well as the suggested listing price.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-3 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 4:
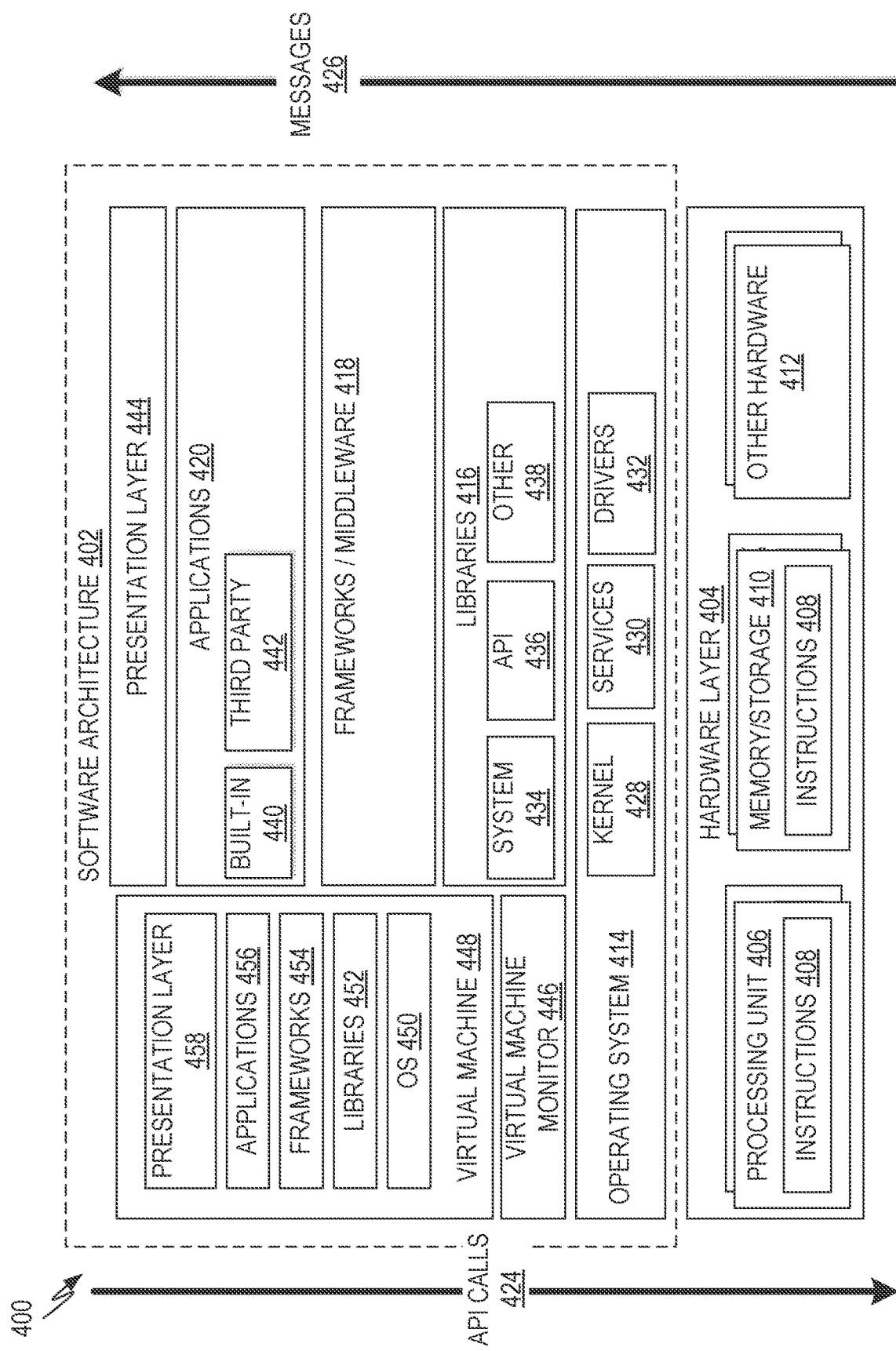
FIG. 4 is a block diagram illustrating an example of a software architecture that may be installed on a machine, according to some example embodiments.

FIG. 4 is a block diagram 400 illustrating a representative software architecture 402, which may be used in conjunction with various hardware architectures herein described. FIG. 4 is merely a non-limiting example of a software architecture and it will be appreciated that many other architectures may be implemented to facilitate the functionality described herein. The software architecture 402 may be executing on hardware such as machine 500 of FIG. 5 that includes, among other things, processors 510, memory 530, and I/O components 550. A representative hardware layer 404 is illustrated and can represent, for example, the machine 500 of FIG. 5. The representative hardware layer 404 comprises one or more processing units 406 having associated executable instructions 408. Executable instructions 408 represent the executable instructions of the software architecture 402, including implementation of the methods, modules and so forth of FIGS. 1-3. Hardware layer 404 also includes memory or storage modules 410, which also have executable instructions 408. Hardware layer 404 may also comprise other hardware as indicated by 412 which represents any other hardware of the hardware layer 404, such as the other hardware illustrated as part of machine 500.

In the example architecture of FIG. 4, the software 402 may be conceptualized as a stack of layers where each layer provides particular functionality. For example, the software 402 may include layers such as an operating system 414, libraries 416, frameworks/middleware 418, applications 420 and presentation layer 422. Operationally, the applications 420 or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be utilized by the applications 420 or other components and/or layers. The libraries 416 typically provide functionality that allows other software modules to perform tasks in an easier fashion than to interface directly with the underlying operating system 414 functionality (e.g., kernel 428, services 430, or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 or other software components/modules, some of which may be specific to a particular operating system or platform.

The applications 420 include built-in applications 440 or third party applications 442. Examples of representative built-in applications 440 may include, but are not limited to, a contacts application, a browser application, a book reader application, a location application, a media application, a messaging application, or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third party application 442 may invoke the API calls 424 provided by the mobile operating system such as operating system 414 to facilitate functionality described herein.

The applications 420 may utilize built in operating system functions (e.g., kernel 428, services 430, or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware machine (such as the machine of FIG. 5, for example). A virtual machine is hosted by a host operating system (operating system 414 in FIG. 5) and typically, although not always, has a virtual machine monitor 446, which manages the operation of the virtual machine as well as the interface with the host operating system (e.g., operating system 414). A software architecture executes within the virtual machine such as an operating system 450, libraries 452, frameworks/middleware 454, applications 456, or presentation layer 458. These layers of software architecture executing within the virtual machine 448 can be the same as corresponding layers previously described or may be different.

Example Machine Architecture and Machine-Readable Medium

Figure 5:
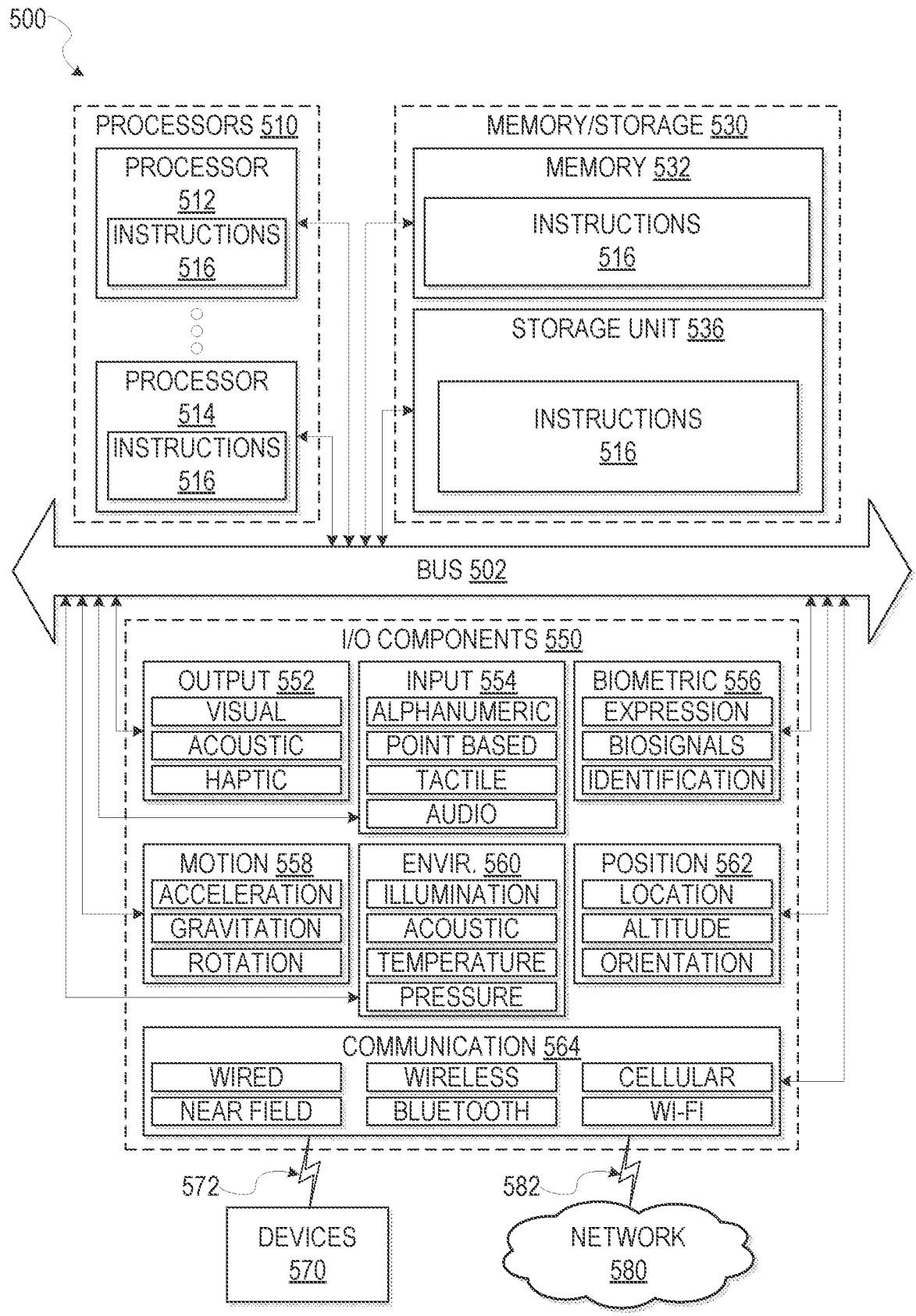
FIG. 5 illustrates a diagrammatic representation of a machine in the form of a computer system within which a set of instructions may be executed for causing the machine to perform any one or more of the methodologies discussed herein, according to an example embodiment.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions may cause the machine to execute the flow diagrams of FIG. 3. Additionally, or alternatively, the instructions may implement the modules illustrated in FIG. 2, and so forth. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500.

Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   detecting that a first client device associated with a user is accessing a platform;
   comparing characteristics of the first client device to stored characteristics of a second client device associated with the user that was previously used to access the platform to determine that the first client device and the second client device are different but are a same type of device;
   determining that the first client device is a new device that has replaced the second client device based on the determination that the first client device and the second client device are different but are the same type of device; and
   generating an invitation to create an electronic listing to sell the second client device, the invitation including a sample electronic listing that is generated by automatically populating fields of the sample electronic listing with information about the second client device, the information about the second client device automatically collected during a previous access of the platform.

2. The method of claim 1, wherein the determining further comprises determining that the first client device is an upgraded version of the second client device.

3. The method of claim 1, wherein the first client device and the second client device are the same type of device but a different brand of device.

4. The method of claim 1, wherein the first client device and the second client device are the same type of device but a different model of device.

5. The method of claim 1, wherein the first client device and the second client device are both smart phones.

6. The method of claim 1, wherein the first client device and the second client device are both tablets.

7. The method of claim 1, further comprising causing display of the invitation on a display of the first client device.

8. The method of claim 1, wherein the invitation includes a suggested price for the second client device.

9. A non-transitory machine-readable storage medium having instructions stored there that, responsive to execution by one or more processors, perform operations comprising:
   detecting that a first client device associated with a user is accessing a platform;
   comparing characteristics of the first client device to stored characteristics of a second client device associated with the user that was previously used to access the platform to determine that the first client device and the second client device are different but are a same type of device;
   determining that the first client device is a new device that has replaced the second client device based on the determination that the first client device and the second client device are different but are the same type of device; and
   generating an invitation to create an electronic listing to sell the second client device, the invitation including a sample electronic listing that is generated by automatically populating fields of the sample electronic listing with information about the second client device, the information about the second client device automatically collected during a previous access of the platform.

10. The non-transitory machine-readable storage medium of claim 9, wherein the determining further comprises determining that the first client device is an upgraded version of the second client device.

11. The non-transitory machine-readable storage medium of claim 9, wherein the first client device and the second client device are both smart phones.

12. The non-transitory machine-readable storage medium of claim 9, wherein the first client device and the second client device are both tablets.

13. The non-transitory machine-readable storage medium of claim 9, further comprising causing display of the invitation on a display of the first client device.

14. The non-transitory machine-readable storage medium of claim 9, wherein the invitation includes a suggested price for the second client device.

15. The non-transitory machine-readable storage medium of claim 9, wherein the characteristics of the first client device comprise data indicative of a model and a brand of the first client device.

16. A system comprising:
   a communications module to detect that a first client device associated with a user is accessing a platform;
   a replaced device detector to:
      compare characteristics of the first client device to stored characteristics of a second client device associated with the user that was previously used to access the platform to determine that the first client device and the second client device are different but are a same type of device;
      determine that the first client device is a new device that has replaced the second client device based on the determination that the first client device and the second client device are different but are the same type of device; and
      generate an invitation to create an electronic listing to sell the second client device, the invitation including a sample electronic listing that is generated by automatically populating fields of the sample electronic listing with information about the second client device, the information about the second client device automatically collected during a previous access of the platform.

17. The system of claim 16, wherein the determining further comprises determining that the first client device is an upgraded version of the second client device.

18. The system of claim 16, wherein the first client device and the second client device are the same type of device but a different brand of device.

19. The system of claim 16, wherein the first client device and the second client device are the same type of device but a different model of device.

20. The system of claim 16, wherein the invitation includes a suggested price for the second client device.

* * * * *